(12) United States Patent
Weinstein

(10) Patent No.: US 7,346,040 B2
(45) Date of Patent: Mar. 18, 2008

(54) PROVIDING A HIGH SPEED DATA MODEM BASED ON MIMO TECHNOLOGY USING A CABLE OR SINGLE ANTENNA

(75) Inventor: Eliahu Weinstein, San Diego, CA (US)

(73) Assignee: AvalonRF, Inc., El Cajon, CA (US)

( * ) Notice: Subject to any disclaimer, the term of this patent is extended or adjusted under 35 U.S.C. 154(b) by 614 days.

(21) Appl. No.: 10/785,365

(22) Filed: Feb. 23, 2004

(65) Prior Publication Data

US 2004/0165568 A1    Aug. 26, 2004

Related U.S. Application Data

(60) Provisional application No. 60/449,623, filed on Feb. 24, 2003.

(51) Int. Cl.
*H04H 1/00* (2006.01)
*H03C 7/02* (2006.01)

(52) U.S. Cl. ...................... 370/339; 455/101

(58) Field of Classification Search ............. 455/101, 455/269; 370/339
See application file for complete search history.

(56) References Cited

U.S. PATENT DOCUMENTS

| | | | | |
|---|---|---|---|---|
| 6,604,202 B1 * | 8/2003 | Nishii et al. | ................ | 713/324 |
| 6,731,602 B1 * | 5/2004 | Watanabe et al. | ........... | 370/231 |
| 2003/0147655 A1 * | 8/2003 | Shattil | ........................ | 398/182 |
| 2004/0030868 A1 * | 2/2004 | Sew | ........................... | 712/220 |
| 2004/0224637 A1 * | 11/2004 | Silva et al. | ................ | 455/63.4 |
| 2006/0209847 A1 * | 9/2006 | Binder | ........................ | 370/400 |

* cited by examiner

*Primary Examiner*—Joseph Feild
*Assistant Examiner*—Michael Faragalla
(74) *Attorney, Agent, or Firm*—Richard D. Clarke

(57) ABSTRACT

A single cable or single antenna space-time fast modem system is described. Very high data transfer rates are accomplished using a space-time MIMO transceiver in combination with a unique space-time antenna reduction chamber and a frequency spectrum shifting module. The system readily connects to any existing communications infrastructure. The high speed data modem system incorporates a MIMO space-time wireless transceiver, yet unlike existing space-time wireless systems, requires only a single cable or antenna to achieve very high data transfer rates. Furthermore, this fast modem system achieves these very rapid data transfer rates, those comparable to a MIMO space-time wireless data link over existing wired or wireless infrastructure while operating at any carrier frequency, including base band, maintains data transfer rates during high speed motion, maintains a predictable separation factor "k" regardless of topographical limitations, is small in size, with no need for numerous cables or antennas, and can be produced at low cost. It is also possible, that the fast modem system described herein can be used with, or connected to any pre-existing communications means (e.g., LAN, WAN, Internet, dedicated lines, etc.) to provide very high speed data transfer rates.

30 Claims, 8 Drawing Sheets

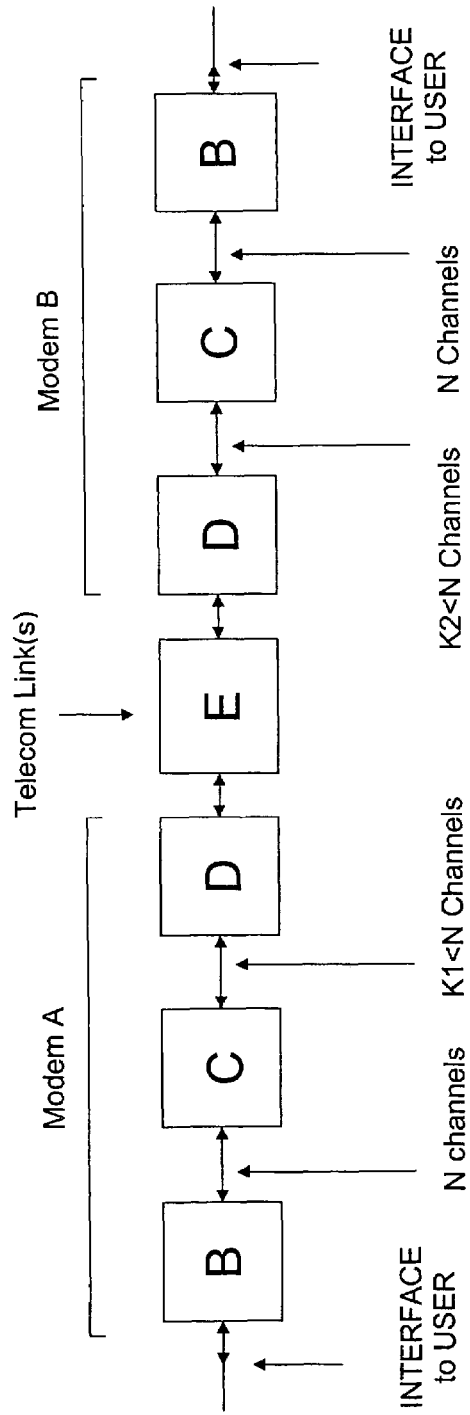

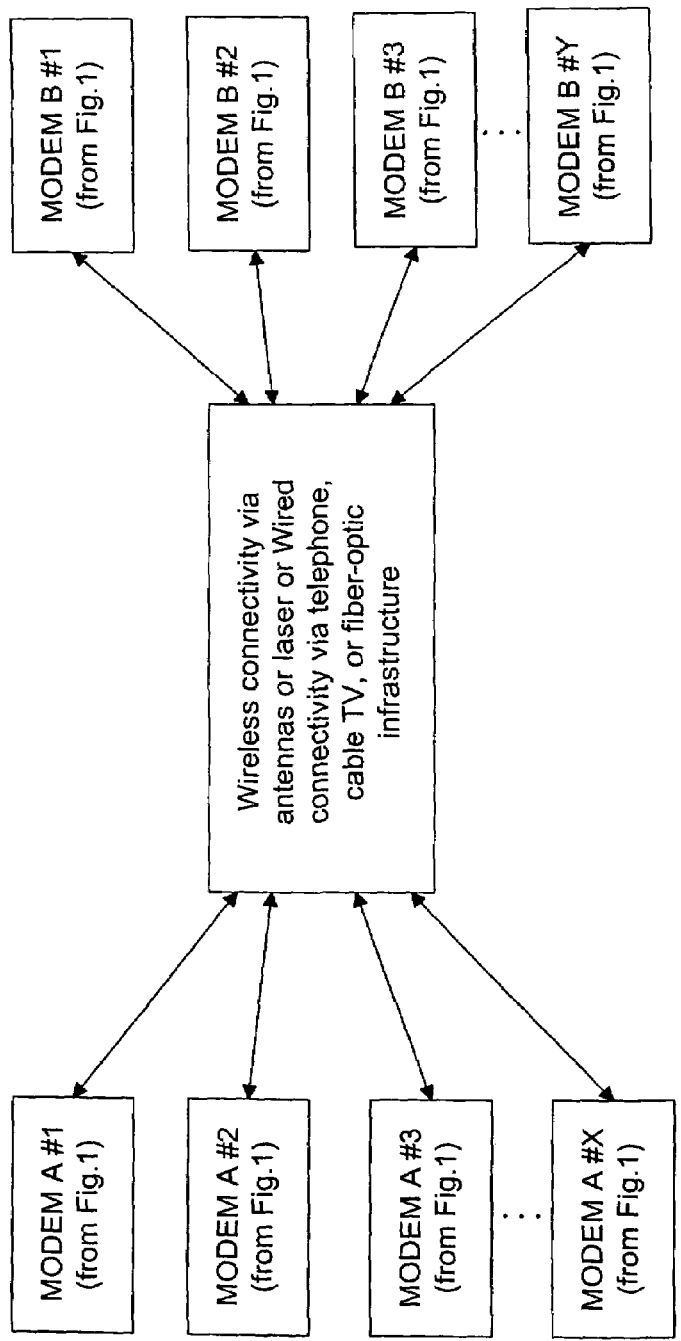

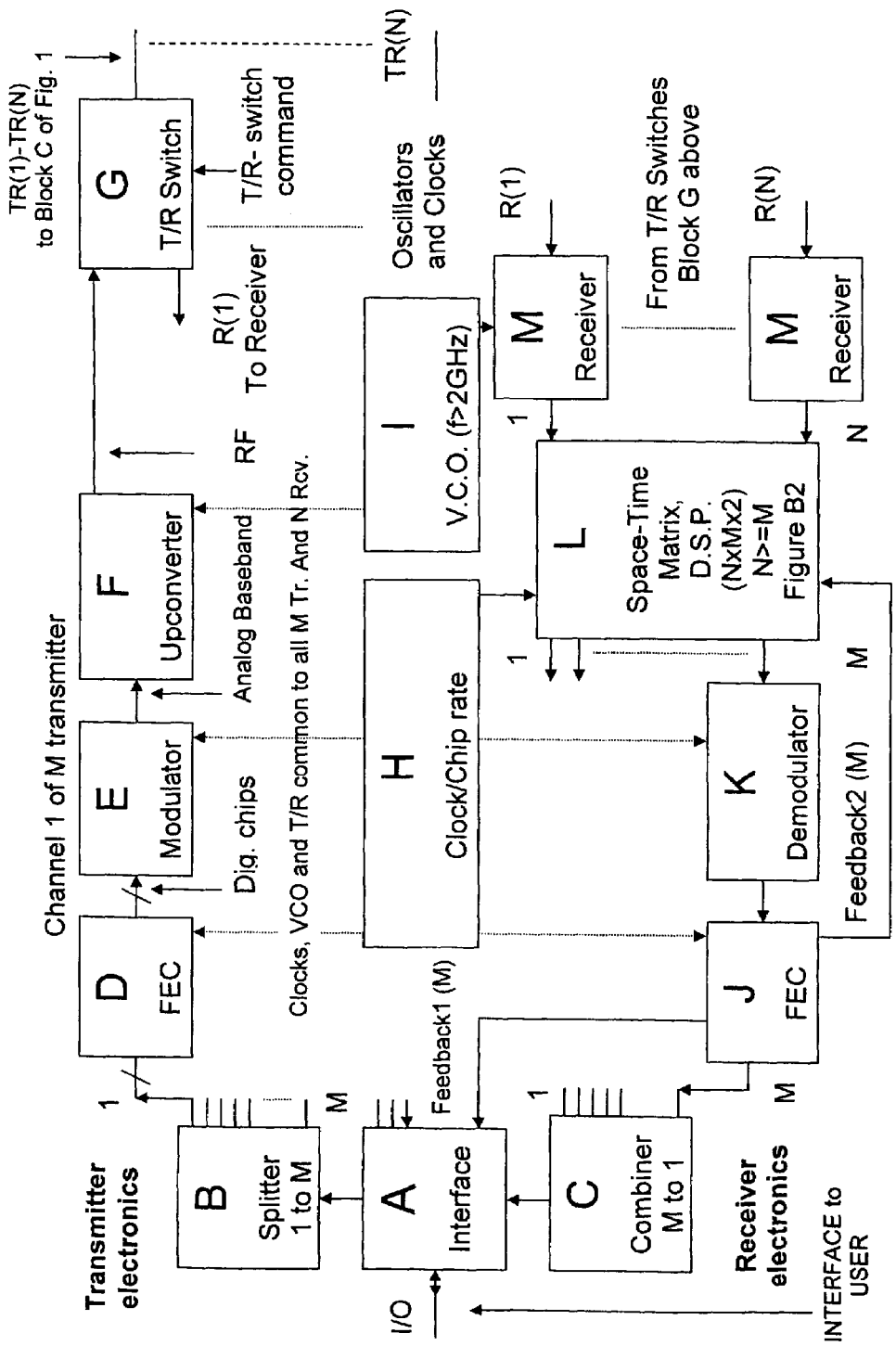

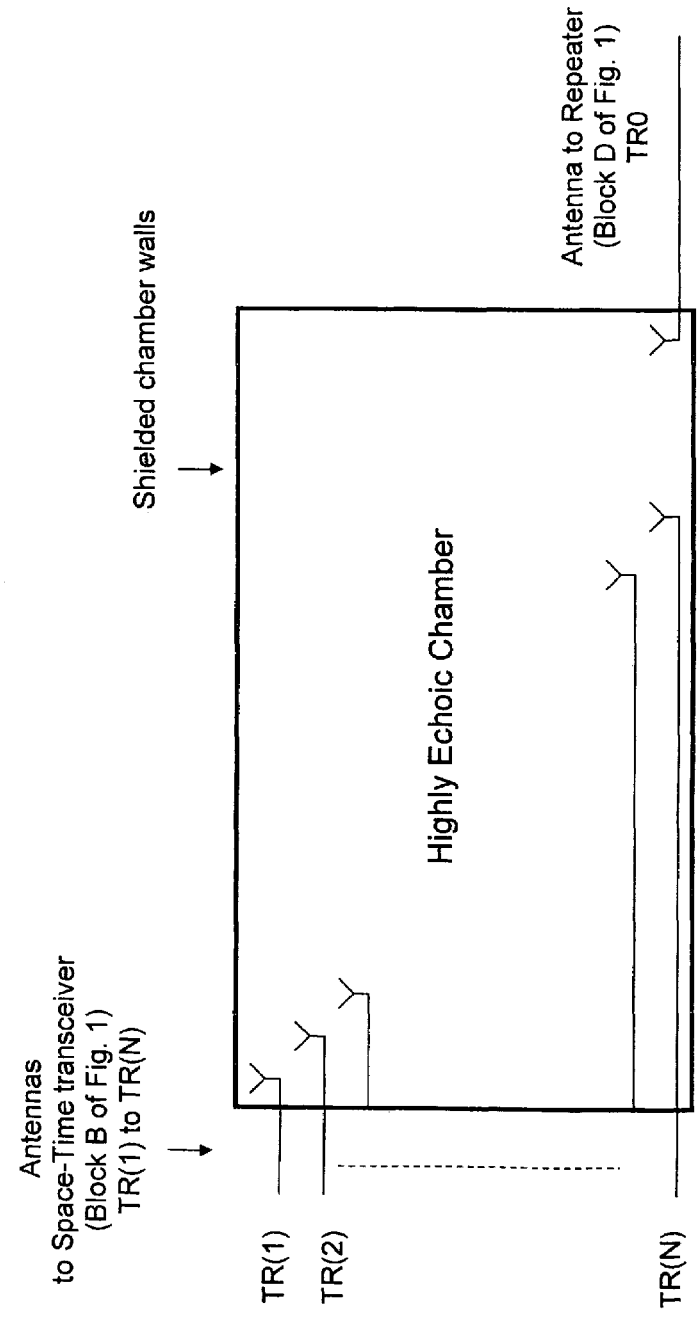

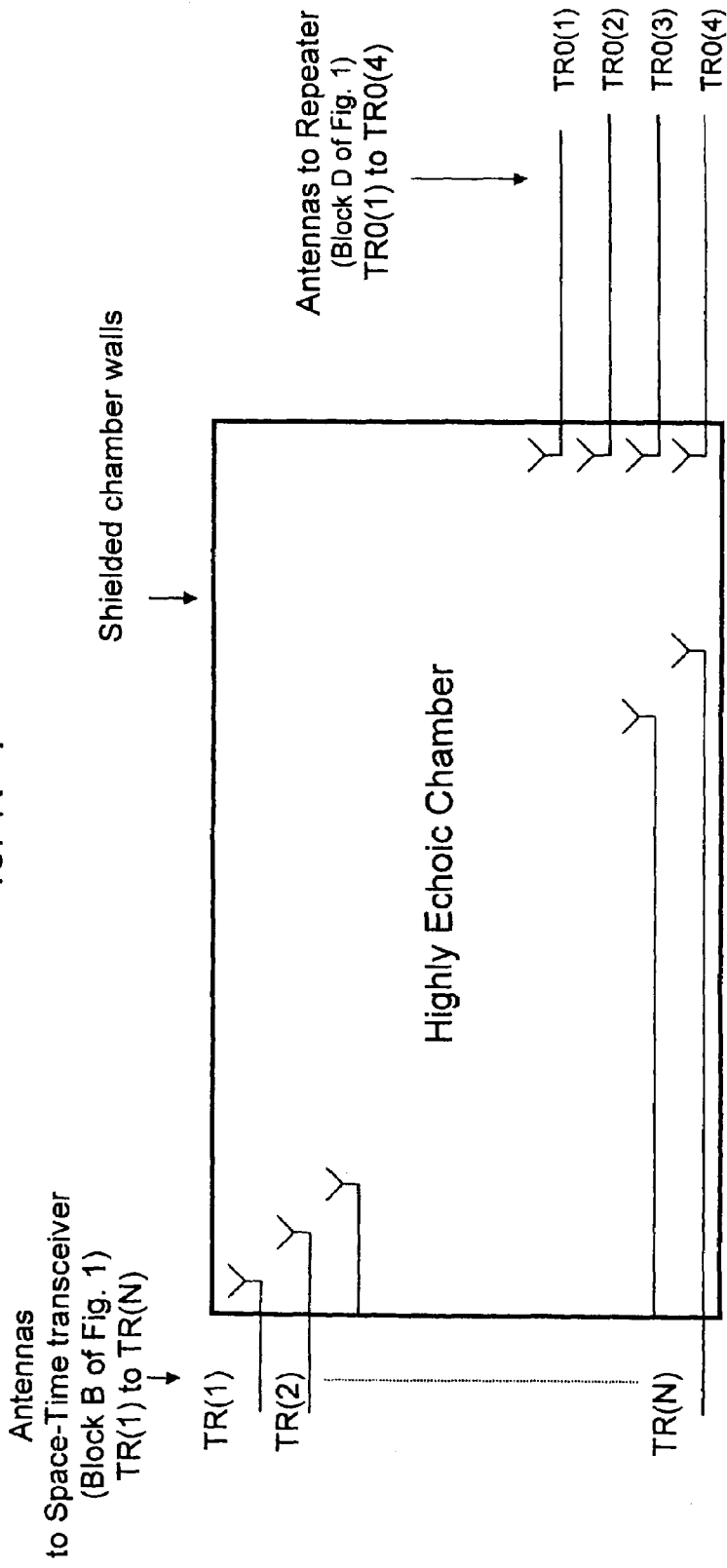
Fig. 5 - The Space-Time Antenna Chamber (Block C of Fig.1) for K=4
Notes
N is the number of TR channels
K is the number of TRO channels

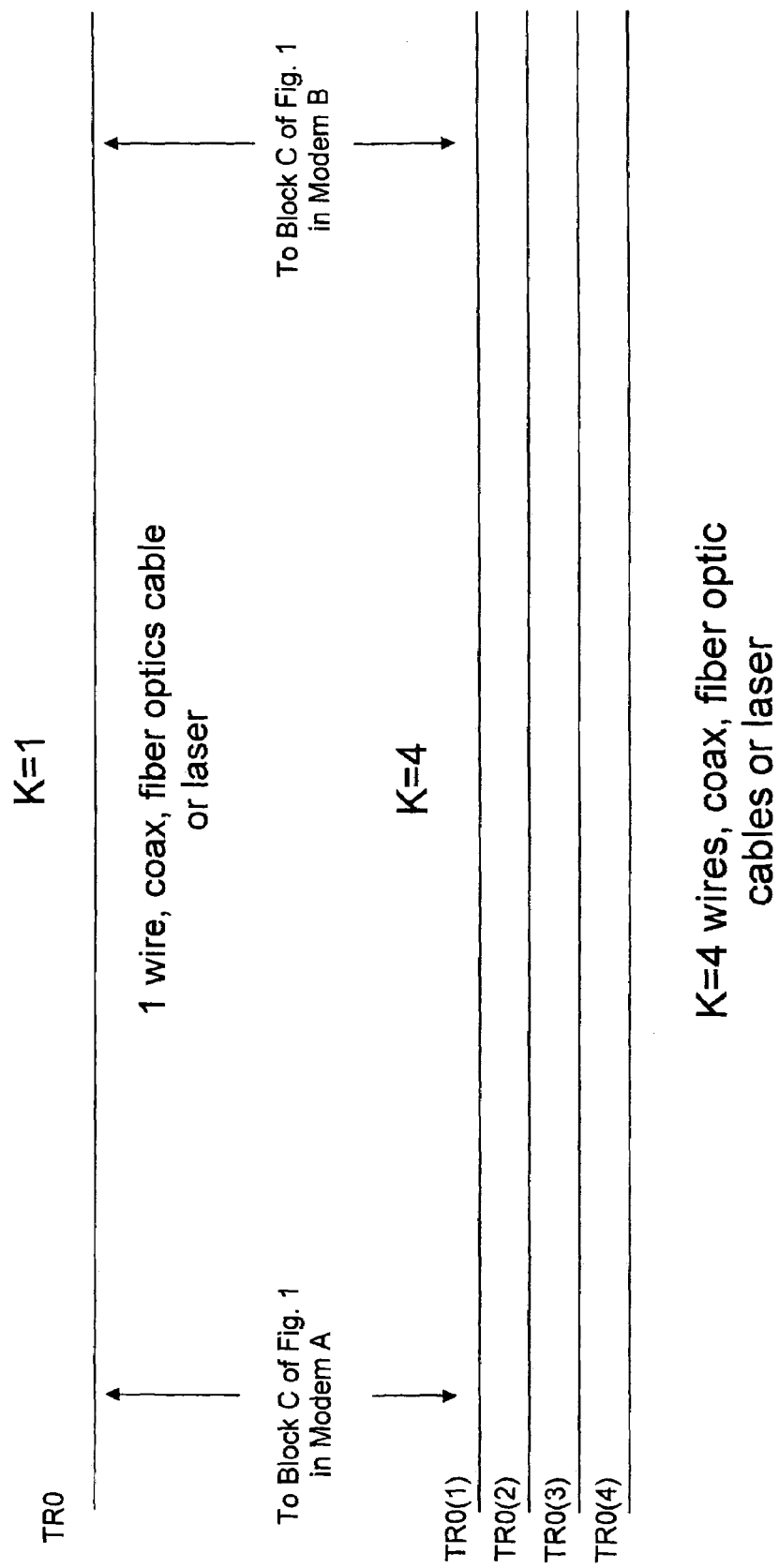

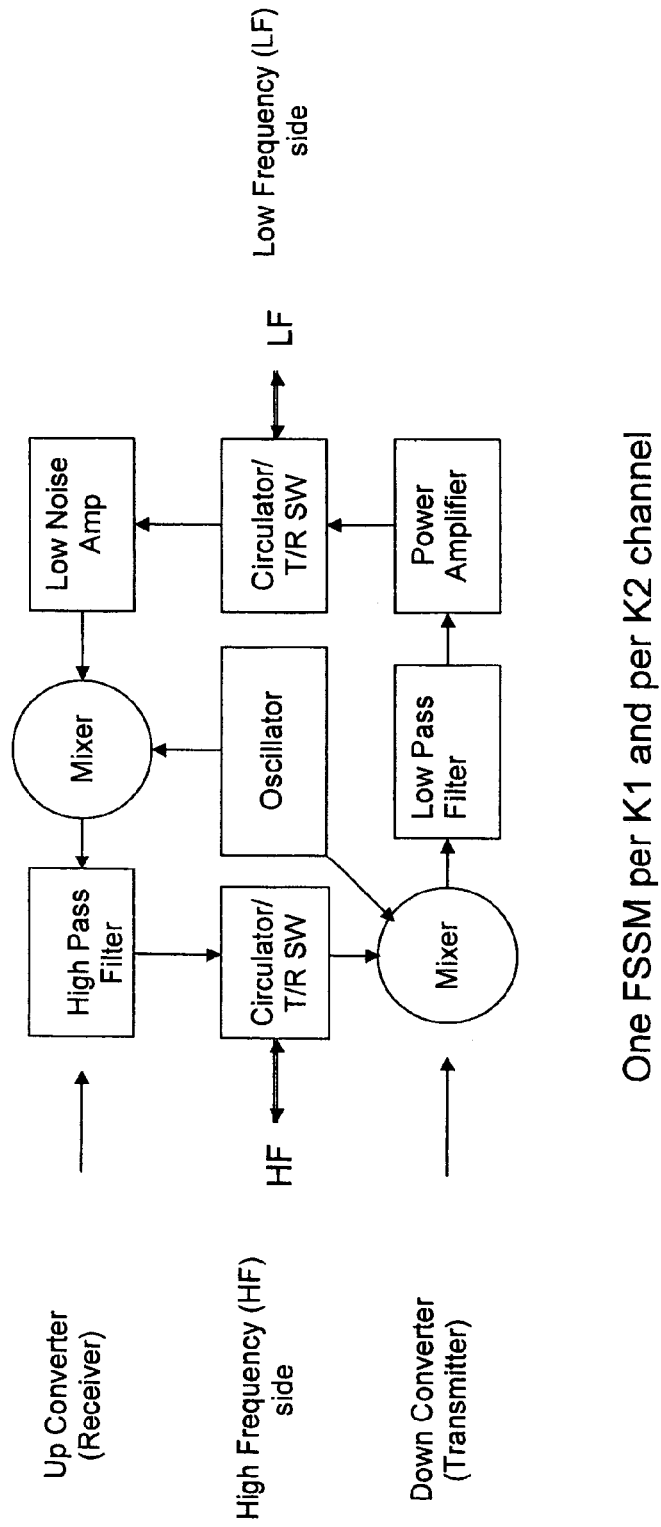

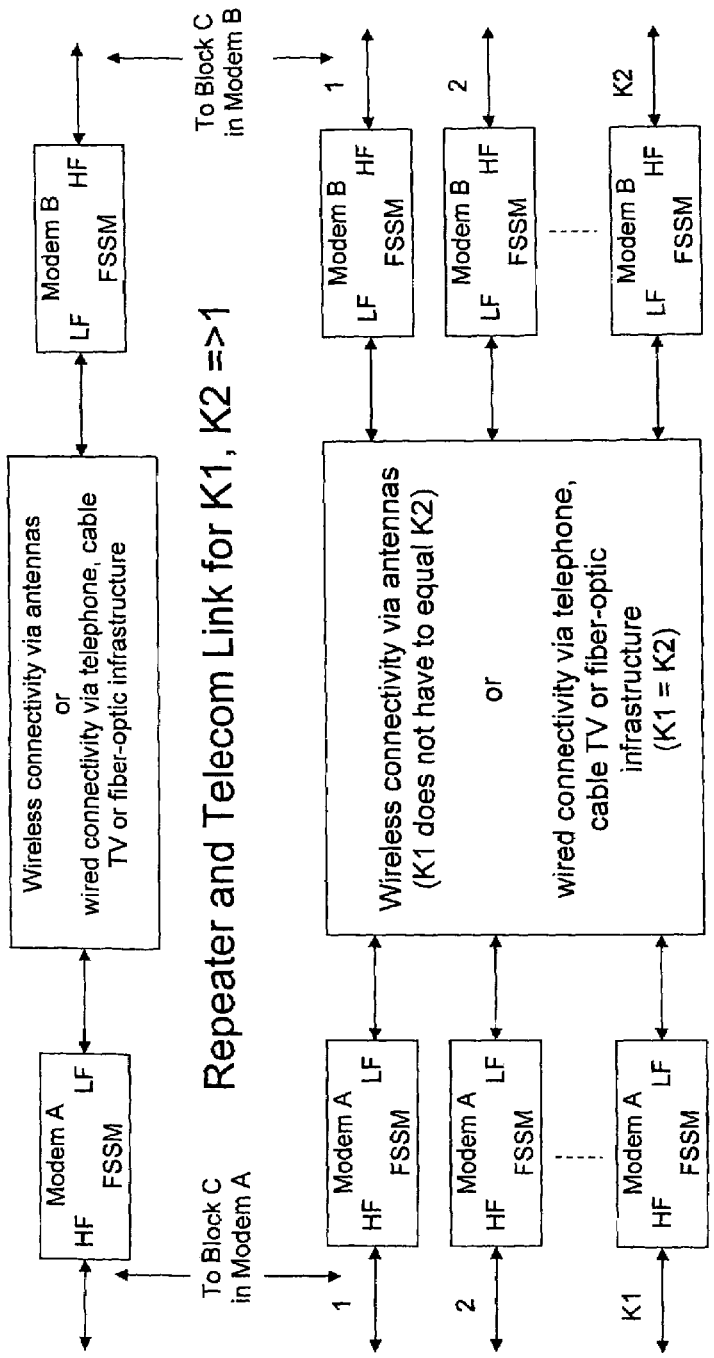

PROVIDING A HIGH SPEED DATA MODEM BASED ON MIMO TECHNOLOGY USING A CABLE OR SINGLE ANTENNA

This application claims the benefit of U.S. Provisional Application Ser. No. 60/449,623 filed on Feb. 24, 2003.

BACKGROUND OF THE INVENTION

1. Field of the Invention

The present invention relates to a new and improved high speed data modem and related system, more specifically, the present invention relates to a new and improved very high speed data modem based on a multiple input multiple output space-time wireless system using a cable or a single antenna.

2. Description of the Related Art

There is a pressing continuously present need to provide rapid transfer of enormous amounts of data between modem systems. To date, none of the prior art devices can achieve this with reliable accuracy of the data being "rapidly" transferred, and data transfer rates remain relatively slow. With the advent of space-time technology, it is now possible to use a multiple input multiple output (MIMO) space-time wireless data link, in combination with the present invention, to achieve very high speed data transfer rates, even when using said combination over the currently existing wired or wireless telecommunications infrastructure.

SUMMARY OF THE INVENTION

Therefore, the principal object of the present invention is to provide a new and improved high speed data modem based on MIMO space-time wireless technology using cable or a single antenna, more specifically, the present invention comprises a novel very high speed data modem system that incorporates a MIMO space-time wireless transceiver, an antenna array reduction chamber, and a frequency spectrum shifting module, to achieve the data transfer rates of a MIMO space-time wireless data link over existing wired or wireless infrastructure, for local, nationwide or worldwide use.

It is a further object of the present invention to provide a high speed modem system that achieves these very high data transfer rates over a single cable or employing a single antenna, equal to that of a space-time wireless system with 20 to 60 or more antennas, each limited by the Shannon limit on channel capacity.

It is a further object of the present invention to provide a high speed modem system that achieves these very high data transfer rates over a single cable or employing a single antenna, and yet operates at any carrier frequency, including base band.

It is a further object of the present invention to provide a high speed modem system that achieves these very high data transfer rates over a single cable or employing a single antenna, and that maintains data transfer rates when the modem is in high speed motion, such as when the modem is placed within a vehicle or aircraft traveling at a high rate of speed.

It is a further object of the present invention to provide a high speed modem system that achieves these very high data transfer rates over a single cable or employing a single antenna, and that maintains a predictable separation factor, known as factor "k," regardless of the topographic limitations.

It is a further object of the present invention to provide a high speed modem system that achieves these very high data transfer rates over a single cable or employing a single antenna, and that allows connectivity to, and data transfer over, existing wire (cable) or wireless telecommunications infrastructure, whether that be telephone lines, cable TV cables, fiber optic cables with analog modems, or wireless connectivity via antennas, satellite repeaters, or analog input/output (I/O) ports of existing communications equipment. Moreover, said data transfer may also be bi-directional.

Finally, it is a further object of the present invention to provide a high speed modem system that achieves these very high data transfer rates over a single cable or employing a single antenna, and that is small in size, eliminates the requirement of hooking up numerous cables or antenna for functioning, and is low cost.

Briefly, the above mentioned objects of the invention are accomplished using a space-time MIMO transceiver in combination with a unique space-time antenna reduction chamber and a frequency spectrum shifting module. The system readily connects to any existing communications infrastructure. The high speed data modem system incorporates a MIMO space-time wireless transceiver, yet unlike existing space-time wireless systems, requires only a single cable or antenna to achieve very high data transfer rates. Furthermore, this fast modem system achieves these very rapid data transfer rates, those comparable to a MIMO space-time wireless data link over existing wired or wireless infrastructure while employing a single cable or a single antenna.

It is also possible, that the fast modem system described herein can be used with, or connected to any existing communications means (e.g., LAN, WAN, Internet, dedicated lines, etc.) to provide very high speed data transfer rates.

BRIEF DESCRIPTION OF THE DRAWINGS

The above mentioned and other objects and features of this invention and the manner of attaining them will become apparent, and the invention itself will be best understood, by reference to the following description of the embodiment of the invention in conjunction with the accompanying drawings, wherein:

FIG. 1 is a space-time link block diagram illustrating the point-to-point connectivity of the fast modem system, constructed in accordance with the present invention;

FIG. 2 is a space-time link block diagram illustrating the multi-point to multi-point connectivity of the fast modem system, constructed in accordance with the present invention;

FIG. 3 is a schematic diagram of the space-time MIMO transceiver, constructed in accordance with the present invention;

FIG. 4 is a schematic diagram of the space-time antenna chamber, where K=1, illustrating the highly echoic chamber, constructed in accordance with the present invention;

FIG. 5 is a schematic diagram of the space-time antenna chamber, where K=4, illustrating the highly echoic chamber, constructed in accordance with the present invention;

FIG. 6 is a block diagram of the repeater and telecommunications link, where K=1 and/or K=4, constructed in accordance with the present invention;

FIG. 7 is a block diagram schematic representation of the frequency spectrum shifting module (FSSM), constructed in accordance with the present invention; and FIG. 8 is a flow diagram illustrating the repeater and telecommunications link between Modem A and Modem B FSSM's, where K=1 and/or K=4, constructed in accordance with the present invention.

DESCRIPTION OF THE PREFERRED EMBODIMENTS

Referring to FIG. 1, there is shown a space-time link block diagram illustrating the point-to-point connectivity of the fast modem system, constructed in accordance with the present invention.

In general, the block diagram of the present fast modem invention and its interconnection as a point to point data link is described in FIG. 1. A more general interconnection in a multi-point to multi-point network is described in FIG. 2 (see below). The entire link includes two identical modems, Modem A and Modem B, and an interconnecting telecommunication infrastructure. This description assumes that Modem A operates in transmit mode and Modem B in receive mode (the system is also capable of working in reverse where Modem B would operate in transmit mode and Modem A would operate in receive mode), and includes the following components:

1. Modem A (here shown operating in transmit mode) having:
    a) a multiple antenna space-time transceiver (shown as Block B of FIG. 1, left side) operating in transmit mode;
    b) an antenna array reduction chamber (shown as Block C of FIG. 1, left side) operating in a reduction mode; and
    c) a frequency spectrum shifting module (shown as Block D of FIG. 1, left side) operating in down convert mode.
2. Existing telecommunications infrastructure links (shown as Block E of FIG. 1). Infrastructure can be any of the following: a conventional telephone line, cable TV, fiber optic cable with analog modems, wireless connectivity via antennas, satellite repeaters or analog I/O ports of existing communication equipment.
3. Modem B (here shown operating in receive mode) having:
    a) a frequency spectrum shifting module (shown as Block D of FIG. 1, right side) operating in frequency up conversion mode;
    b) an antenna array reduction chamber (shown as Block C of FIG. 1, right side) operating in antenna expansion mode; and
    c) a multiple antenna space-time transceiver (Block B of FIG. 1, right side) operating in receive mode.

Referring to FIG. 2, there is shown a space-time link block diagram illustrating the multi-point to multi-point connectivity of the fast modem system, constructed in accordance with the present invention. Modem A can be any number (here represented by an "X") of transmitting modems (or receiving modems if operating in reverse). Likewise, Modem B can be any number (here represented by a "Y") of receiving modems (or transmitting modems if operating in reverse). Moreover, the number of Modem A's does not have to equal the number of Modem B's, thus, X does not have to equal Y in the present invention.

Referring to FIG. 3, there is shown a schematic diagram of the space-time MIMO transceiver, constructed in accordance with the present invention. The Space-Time transmitter in Modem A (shown as Block B in FIG. 1 and FIG. 2 top section). This transmitter is a Space-Time transmitter with N output channel, as described by Foschini[1] with the following additional circuits:

a) a back channel that receives feed back from the receiver inside Modem B on the channel signature matrix, the Signal to Noise Ratio (SNR), Bit Error Rate (BER) and requests to retransmit corrupt data packets;
b) interface electronics to make the transmitter compatible to various industry standard protocols, such as the Society of Motion Picture and Television Engineers (SMPTE) standards for High Definition TV (HDTV) and Ethernet; and
c) a transmitter which must fulfill the following requirements:
   1) the carrier frequency of the transmitter is generated by a Voltage Controlled Oscillator (Fvco) (shown as Block I of FIG. 3) and should be as high as possible to reduce the size of the antenna reduction chamber (the size of the antennas and the distance in between the antennas that must be at least half a wavelength apart);
   2) the bandwidth of the transmitter is limited to the bandwidth of the type of infrastructure it will use as long range interconnection media;
   3) the transmitter must exhibit very low phase noise;
   4) the output power is as low as possible; and
   5) the transmitter adds Forward Error Correction (FEC) coding.
d) the overall data rates that the transmitter can handle are limited by its Radio Frequency (RF) output bandwidth and by test results obtained by Watkins Johnson as described in the Massimiliano[2] reference, which are 208 bit/hz/sec of bandwidth.

Referring to FIG. 4, there is shown a schematic diagram of the space-time antenna chamber, where K=1, illustrating the highly echoic chamber, constructed in accordance with the present invention.

Referring to FIG. 5, there is shown a schematic diagram of the space-time antenna chamber, where K=4, illustrating the highly echoic chamber, constructed in accordance with the present invention.

Therefore, with regard to FIGS. 4 and 5, the space-time antenna array reduction chamber is shown in greater detail (as shown in Block C of FIG.1, left side, and here in FIGS. 4 and 5 below).

The space-time antenna array reduction chamber is an engineered electrical component that fulfills the following requirements:

a) its outside skin is shielded to provide predictable and repeatable performance without being susceptible to interference from EMI and without causing interference to other radio systems. The inside of the chamber walls may include lumped networks that will help in creating a "scattering rich space-time" environment.
b) it has N "input" antennas. Only M (M<N) antennas need be used for transmission. The rest of the N−M can be used for receive diversity in a two way data link.
c) it has K1 output antennas, with K1=1 or more but a lot smaller than M or N. In most cases, K1=1 is enough, because the extra antennas do not increase channel capacity but can provide redundancy and link diversity.
d)1 the chamber can be made as small as practical to create a space-time environment with a separation factor "k" of 1. This includes spacing of the internal antennas at least half a wavelength apart in a pattern that will guarantee that no two antennas will have the same space-time signature.
e) to reduce the size further, the "chamber" may be filled with high dielectric low loss microwave materials.

f) the space-time chamber may be replaced by a Digital Signal Processing (DSP) processor that will create a unique "scattering rich space-time" signature in a software defined radio and other synthetic low frequency waveforms that will aid in the separation of the signals among the N antennas.

The antenna positions inside the chamber can be configured in multiple ways to provide private encryption per customer.

Referring to FIG. 6, there is shown a block diagram of the repeater and telecommunications link, where K=1 and/or K=4, constructed in accordance with the present invention. Here, infrastructure is described in greater detail (shown as Block E in FIG. 1). Infrastructure can be any of the following:

a) Any audio infrastructure with a bandwidth of 4-5 KHz, such as telephone, cell phone, walkie-talkie and long range short wave marine radios;
b) Cable TV modem infrastructure with a bandwidth of 10 MHz;
c) Fiber optic cable with analog modems;
d) Wireless connectivity via antennas, a line-of-sight laser beam or infrared links, such as FCC license free Industrial Scientific Medical (ISM) band at 900 MHz, 2.4 GHz and 5.8 GHz over a bandwidth of 20 MHz; or
e) Satellite repeaters or analog I/O ports of existing communication gear.

Referring to FIG. 7, there is shown a block diagram schematic representation of the frequency spectrum shifting module (FSSM), constructed in accordance with the present invention.

Finally, referring to FIG. 8, there is shown a flow diagram illustrating the repeater and telecommunications link between Modem A and Modem B FSSM's, where K=1 and/or K=4, constructed in accordance with the present invention. Here in FIGS. 7 and 8, the Frequency Spectrum Shift Module (FSSM) is shown in greater detail (as shown in Block D in FIG. 1, left side, and in FIG. 6, and here in FIG. 8).

The transmitter section of FSSM in Modem A can be any of the following:

a) Short circuit(s) (FIG. 6).
   A coaxial cable or any other cable capable of conducting energy at the frequency of operation over the specified bandwidth.
b) A down converter to shift the frequency spectrum from microwave to a lower spectrum or even base-band, in order to make it compatible with the carrier frequencies of existing infrastructure (Fc).

The down converter includes the following functional blocks:
b.1 A circulator or Transmit/Receive (T/R) switch to separate the transmit pass from the receive pass.
b.2 An oscillator with its frequency set to:

$Ffssm=Fvco-Fc$ b.3 A mixer that mixes the incoming signal around Fvco with Fc.
b.4 A low pass filter to attenuate the unwanted side-band.
b.5 A Power Amplifier (PA) driving a transmit antenna.
b.6 A circulator or Transmit/Receive (T/R) switch to separate the transmit pass from the receive pass.

The receiver section of FSSM in Modem B can be any of the following:

a) Short circuit(s) (FIG. 6)— only if the FSSM in Modem A is also a short circuit. A coaxial cable or any other cable capable of conducting energy at the frequency of operation over the specified bandwidth.
b) An up converter to shift the frequency spectrum from base-band or lower spectrum back to microwave, in order to make it compatible with the space-time requirements imposed on the antenna array reduction chamber.

The up converter includes the following functional blocks:
b.1 A circulator or Transmit/Receive (T/R) switch to separate the transmit pass from the receive pass.
b.2 A Low Noise Amplifier (LNA) to amplify the signal.
b.3 An oscillator with its frequency set to:

$Ffssm=Fvco-Fc$ b.4 A mixer that mixes the incoming signal around Fvco with Fc.
b.5 A high pass filter to attenuate the unwanted side-band.
b.6 A circulator or Transmit/Receive (T/R) switch to separate the transmit pass from the receive pass.

The space-time antenna array expansion chamber is described herein greater detail (as shown in Block C of FIG. 1, right side and FIGS. 4 and 5).

This chamber is "identical" to the chamber described above, except that the single antenna in FIG. 4 and the K2 antennas in FIG. 5 serve as the energy radiator(s) and the N antennas serve as receive antennas.

The following are exceptions to the requirement of "identical":

a) For reasons of redundancy and diversity, in a unidirectional wireless mode (transferring data from Modem A to Modem B), there is a advantage in a configuration where K2>K1, where K1 is the number of output antennas in Modem A and K2 is the number of input antennas in Modem B.
b) For reasons of security, each and every chamber may be configured in such a way that the space-time signature of every transmitting chamber can by identified from a remote location.

Here the Space-Time receiver in Modem B is described in greater detail (as shown in Block B in FIG.1 and FIG. 2 lower section).

This receiver is a Space-Time receiver with N input channel, as described by the Foschini[1] reference, with the following additional circuits:

a) A back channel that feeds back to the transmitter inside Modem A, the channel signature matrix, the signal to noise ratio, BER and requests to re-transmit corrupt data packets.
b) Interface electronics to make the receiver compatible to the same industry standard protocols used in the transmitter.
c) The receiver must fulfill the following requirements:
c.1 The carrier frequency of the receiver is generated by the same Voltage Controlled Oscillator (Fvco) (Block I of FIG. 2) used by the transmitter and should be as close as possible to the Fvco of the transmitter in Modem
c.2 The bandwidth of the receiver needs to be as close as possible to the bandwidth of the transmitter in Modem A to obtain the best possible Bit Error Rate (BER).
c.3 The receiver must exhibit very low phase noise.
c.4 The receiver includes FEC to improve SNR by ~8 db for a BER of 1E-7.
d) The overall data rates that the receiver can handle are identical to the data rates output by the transmitter in Modem A.

ADVANTAGES OF THE PRESENT INVENTIVE SYSTEM

The present invention has the following advantages over the prior art:

1. A space-time MIMO wireless link can use a Single Input Single Output (SISO) repeater or a few SISO repeaters in series to extend its range.

The prerequisite for using a SISO repeater is that no two antennas on the MIMO transmitter will have an identical path towards the receiving antenna of the repeater and the transmitting side of the repeater will not have an identical path to any two antennas on the MIMO receiver.

2. The antennas of the MIMO transmitter and the receive antenna of the SISO repeater can be combined into an engineered component called a Space-Time Antenna Reduction Chamber (STARC).

3. The transmit antenna of the SISO repeater and the receive antennas of the MIMO receiver can be combined and manufactured as an engineered component, called a Space-Time Antenna Expansion Chamber (STAEC).

4. An STARC can be used as a STAEC and vice versa.

5. A STARC can switched over to a STAEC using circulators or T/R switches.

6. A STARC (or STAEC) is an engineered component designed to guarantee predictable and repeatable channel separation k=1.

7. The higher the carrier frequency of the space-time transceiver, the smaller the space-time antenna reduction chamber is, due to the requirement for a minimum distance of ½ wavelength between the various antennas to obtain channel separation.

8. STARCs (and/or STAECs) can be engineered to exhibit various channel signatures, each providing a unique identification of the transmitter and encryption to prevent non identical chambers from hacking the data being transferred.

9. A STARC can be followed with a wireless STAEC that has no shielding (as described above) to add diversity and beam forming capability to the link in wireless applications in order to extend the range with no increase in RF power.

10. A single input (K2=1) STAEC can be preceded by a STARC to add diversity and interference elimination (via receiver beam forming). This topology is a multi-step space-time conversion radio.

11. A STARC can be viewed as a signal combiner, adding to the various transmitted data the space-time signal signature and outputting the combined signal on a single RF feed.

12. A STARC can be implemented as a software IP block inside another software defined radio.

13. The output spectrum of a STARC can be frequency shifted to any other frequency, including base-band (carrier frequency=0).

14. If the spectrum of the STARC is frequency shifted from Fvco to Fc at the transmitter side, then STAEC must shift the received spectrum back from Fc to Fvco (within some acceptable tolerance).

15. Fc can be at Extremely Low Frequencies (ELF), Long Waves (LW), Middle Wave (MW), Short Wave (SW), VHF or UHF.

At these frequencies, conventional space-time technology is not practical because of the requirement to maintain a minimum spacing among the various antennas of at least ½ wavelength on both the transmitter and the receiver sides.

16. Spectrum shifting after the STARC and before the STAEC makes the modem compatible with existing telecommunication infrastructure.

17. Adding data compression to the transmitter and decompression to the receiver (such as Ziv-Lempel) may improve the effective data transfer rates by a factor of over two.

18. The transmitter can add to each and every of the wireless data stream engineered "Scattering rich waveforms" that will aid in the signal separation. These waveforms can be orthogonality functions such as Walsh functions and have a spread of 0 to 512+chips(*).

(*) Chips are clock cycles generated by block H in FIG. 2, with each chip transmitting one data symbol per each transmit antenna.

19. The transmitter can add periodical "guard" signals to guarantee that the spectrum allocated for data does not overlap the spectrum allocated for the space-time signature.

20. The receiver side of a space-time link can feed back to the transmitter the "channel signature" matrix, allowing the transmitter to compensate for multi-pass distortion by modifying the "scattering rich waveforms" and increase or decrease its output power to guarantee a minimal SNR and BER at the receiver.

21. Adding a narrow band continuous wave (CW) pilot carrier of known frequency to the transmitter allows the measurement of the Doppler shift in the receiver and calculation of motion estimation in order to compensate the channel signature matrix in the receiver without excessive training sequences.

This improves the usefulness of space-time technology in mobile applications, such as cars, airplanes, rockets or low orbit satellites.

22. The training and recalibration sequences of the space-time modem can be combined with frequency hopping of the transmitter carrier, to add stealth and robustness against jamming and beam locating equipment.

23. All the above advantages can be implemented in a two way connectivity application, with each direction subject to any or all the above claims.

24. The entire modem can be implemented as a software block inside a software defined radio, such as a Department Of Defense JTRS radio.

APPLICATIONS OF THE PRESENT INVENTIVE SYSTEM

The present invention system has the following contemplated applications (with many others not yet devised):

1. A modem that operates over 4 KHz wired or wireless audio channels, such as phone lines, cell phones, satellite cell phones, point to point AM or SSB radio links and/or "Walkie-Talkies".

Such a modem will have data transfer rates over 500 Kbit/sec and provide connectivity for full speed video conferencing or 16 IP cameras.

2. The modem as described above with multiplexed inputs, each with 56 Kbit/sec, 128 Kbit/sec or 256 Kbit/sec to allow connectivity to multiple users, each with lower data rates.

3. A wireless modem that operates on 25 KHz channels, such as narrow band military and law enforcement communication equipment or a military PDA.

Such a modem will have data transfer rates over 2.6 Mbit/sec.

4. The modem as described above for use as an In-Car-Video-System (ICVS), providing online connectivity from cameras on troops, law enforcement officers, fire fighters and their vehicle back to headquarters.

5. Wireless modem that operates on 200 KHz FM channels, such as FM radio and wireless microphone channels. Such a modem will offer data rates over 40 Mbit/sec.

6. Modem that operates on 3.5-10 MHz channels, such as broadcast TV or cable TV channel. Such a modem will have data rates over 200 Mbit/sec.

7. Wireless modem that operates on FCC approved license free ISM bands with a 20 MHz channel spacing, such as the 900 MHz, 2.4 GHz, 5.8 GHz bands. Such a modem will have data rates over 1.5 Gbit/sec.

8. Gigabit Ethernet wireless Local Area Network with channel capacities in excess of 1.5 Gbit/sec.

9. A transmitter or receiver or internet modem of DSS satellite service with channel spacing of 20 MHz or 40 MHz, increasing channel capacity by a ratio of 20:1 or more and enabling service of movies on demand.

10. A Wireless Access Point (WAP) transceiver in a last mile solution application, operating on 20 MHz channels and servicing over 1000 T1 or 4000 DSL accounts.

11. A WAP transceiver in a last mile solution application, operating on 20 MHz channels and offering voice, video and internet connectivity to over 10,000 subscribers.

It should be understood, however, that even though these numerous characteristics and advantages of the invention have been set forth in the foregoing description, together with details of the structure and function of the invention, the disclosure is illustrative only, and changes may be made in detail, especially in matters of shape, size, interactivity and arrangement of components within the principal of the invention to the full extent indicated by the broad general meaning of the terms in which the appended claims are expressed.

REFERENCES

1. G. J. Foschini, and M. J. Gans. Capacity when Using Multiple Antennas at Transmit and Receive Sites and Raleigh-Faded Matrix Channel is Unknown to the transmitter. Advances in Wireless Communications, Kulwer Academic Publishers, 1998.

2. Massimiliano, Max Martone. Multi-antenna Digital Radio Transmission. Artech House Publishers, 2002.

I claim:

1. A wireless space-time fast modem system for transmitting data between two or more user interfaces at high transfer rates comprising:
   a first modem means and a second modem means interconnected by a conventional wireless telecommunications link, whereby each of said first modem means and second modem means further comprises:
   (a) single antenna means;
   (b) two or more multiple input/multiple output (MIMO) space-time wireless transceiver means;
   (c) an antenna array reduction or expansion chamber associated with said two or more MIMO space-time wireless transceivers; and
   (d) a frequency spectrum shifting module associated with said two or more MIMO space-time wireless transceivers;
   whereby said first modem means and said second modem means act as a high speed transmitter and a high speed receiver of data transferred between two user interfaces through the conventional wireless telecommunications link;
   and further wherein said first modem acts as a space-time transmitter, and further includes one or more output channels, at least one of which transmits forward correction coding;
   said one or more output channels includes a back channel which receives feedback from said second modem means relating to said forward correction coding, and thereby receives signal to noise information and bit error rate information to facilitate requests to retransmit corrupt data packets; and
   said second modem acts as a space-time receiver, and further includes one or more input channels, at least one of which receives forward correction coding transmitted by said first modem means.

2. The space-time fast modem system for transmitting data between two or more user interfaces at high transfer rates according to claim 1, wherein said high transfer rates are between about 500 kbit/sec and 1.5 Gbit/sec depending upon the wireless modem application used.

3. The space-time fast modem system for transmitting data between two or more user interfaces at high transfer rates according to claim 1, wherein at least one of said input channels is used to receive error information, analyze said error information and transfer a continuous space-time training sequence as a means to allow for reduction of channel common mode noise and compensation for doppler frequency shift and doppler spread without impacting channel capacity in high speed mobile applications.

4. The space-time fast modem system for transmitting data between two or more user interfaces at high transfer rates according to claim 1, wherein said two or more multiple input/multiple output (MIMO) space-time wireless transceiver means, includes conventional interface electronics to make said transceivers compatible with existing industry standard protocols.

5. The space-time fast modem system for transmitting data between two or more user interfaces at high transfer rates according to claim 1, wherein said antenna array reduction or expansion chamber associated with said two or more MIMO space-time wireless transceivers includes outside shielding to prevent adverse electromagnetic interference and to prevent said MIMO space-time transceivers from generating interference adverse to other radio systems.

6. The space-time fast modem system for transmitting data between two or more user interfaces at high transfer rates according to claim 1, wherein said antenna array reduction or expansion chamber associated with said two or more MIMO space-time wireless transceivers includes one or more input antennas and one or more transmission antennas, whereby the number of input antennas is greater than the number of transmission antennas within any given antenna array.

7. The space-time fast modem system for transmitting data between two or more user interfaces at high transfer rates according to claim 1, wherein said antenna array reduction or expansion chamber is replaced by a digital signal processing (DSP) processor for the purpose of creating a unique scattering rich space-time signature to aid in the separation of signals among the input antennas within said antenna array.

8. The space-time fast modem system for transmitting data between two or more user interfaces at high transfer rates according to claim 1, wherein said frequency spectrum shifting module includes a down converter when associated with the first modem means, the transmitting modem, for the purpose shifting the frequency spectrum from microwave to a lower spectrum, down to base-band, in order to make said first modem compatible with standard carrier frequencies of existing infrastructure.

9. The space-time fast modem system for transmitting data between two or more user interfaces at high transfer rates according to claim 8, wherein said down converter includes an oscillator with a frequency expressed as:

$$Ffssm = Fvco - Fc$$

where Ffssm is the frequency of the frequency spectrum shift module, Fvco is the frequency of the voltage control oscillator frequency, and Fc is the carrier frequency, whereby the voltage controlled oscillator is a component of said first modem means, the transmitter modem.

10. The space-time fast modem system for transmitting data between two or more user interfaces at high transfer rates according to claim 1, wherein said multiple input/multiple output (MIMO) space-time wireless transceiver means utilize a single input/single output (SISO) repeater, or two or more SISO repeaters in series, to extend its operating distance range.

11. A hard wired space-time fast modem system for transmitting data between two or more user interfaces at high transfer rates comprising: a first modem means and a second modem means interconnected by a conventional hard wired telecommunications link, whereby each of said first modem means and second modem means further comprises:
   (a) single antenna means;
   (b) two or more multiple input/multiple output (MIMO) space-time wireless transceiver means;
   (c) an antenna array reduction or expansion chamber associated with said two or more MIMO space-time wireless transceivers; and
   (d) a frequency spectrum shifting module associated with said two or more MIMO space-time wireless transceivers;
   whereby said first modem means and said second modem means act as a high speed transmitter and a high speed receiver of data transferred between two user interfaces through the conventional hard wired telecommunications link;
   and further wherein said first modem acts as a space-time transmitter, and further includes one or more output channels, at least one of which transmits forward correction coding;
   said one or more output channels includes a back channel which receives feedback from said second modem means relating to said forward correction coding, and thereby receives signal to noise information and bit error rate information to facilitate requests to retransmit corrupt data packets; and
   said second modem acts as a space-time receiver, and further includes one or more input channels, at least one of which receives forward correction coding transmitted by said first modem means.

12. The space-time fast modem system for transmitting data between two or more user interfaces at high transfer rates according to claim 11, wherein said high transfer rates are between about 500 kbit/sec and 1.5 Gbit/sec.

13. The space-time fast modem system for transmitting data between two or more user interfaces at high transfer rates according to claim 11, wherein at least one of said input channels is used to receive error information, analyze said error information and transfer a continuous space-time training sequence as a means to allow for reduction of channel common mode noise and compensation for doppler frequency shift and doppler spread without impacting channel capacity in high speed mobile applications.

14. The space-time fast modem system for transmitting data between two or more user interfaces at high transfer rates according to claim 11, wherein said two or more multiple input/multiple output (MIMO) space-time wireless transceiver means, includes conventional interface electronics to make said transceivers compatible with existing industry standard protocols.

15. The space-time fast modem system for transmitting data between two or more user interfaces at high transfer rates according to claim 11, wherein said antenna array reduction or expansion chamber associated with said two or more MIMO space-time wireless transceivers includes outside shielding to prevent adverse electromagnetic interference and to prevent said MIMO space-time transceivers from generating interference adverse to other radio systems.

16. The space-time fast modem system for transmitting data between two or more user interfaces at high transfer rates according to claim 11, wherein said antenna array reduction or expansion chamber associated with said two or more MIMO space-time wireless transceivers includes one or more input antennas and one or more transmission antennas, whereby the number of input antennas is greater than the number of transmission antennas within any given antenna array.

17. The space-time fast modem system for transmitting data between two or more user interfaces at high transfer rates according to claim 11, wherein said antenna array reduction or expansion chamber is replaced by a digital signal processing (DSP) processor for the purpose of creating a unique scattering rich space-time signature to aid in the separation of signals among the input antennas within said antenna array.

18. The space-time fast modem system for transmitting data between two or more user interfaces at high transfer rates according to claim 11, wherein said frequency spectrum shifting module includes a down converter when associated with the first modem means, the transmitting modem, for the purpose shifting the frequency spectrum from microwave to a lower spectrum, down to base-band, in order to make said first modem compatible with standard carrier frequencies of existing infrastructure.

19. The space-time fast modem system for transmitting data between two or more user interfaces at high transfer rates according to claim 18, wherein said down converter includes an oscillator with a frequency expressed as:

$$Ffssm = Fvco - Fc$$

where Ffssm is the frequency of the frequency spectrum shift module, Fvco is the frequency of the voltage control oscillator frequency, and Fc is the carrier frequency, whereby the voltage controlled oscillator is a component of said first modem means, the transmitter modem.

20. The space-time fast modem system for transmitting data between two or more user interfaces at high transfer rates according to claim 11, wherein said multiple input/multiple output (MIMO) space-time wireless transceiver means utilize a single input/single output (SISO) repeater, or two or more SISO repeaters in series, to extend its operating distance range.

21. A method for making a wireless space-time fast modem system for transmitting data between two or more user interfaces at high transfer rates comprising the steps of:
   providing a first modem means and a second modem means interconnected by a conventional wireless telecommunications link, whereby each of said first modem means and second modem means further comprises:
(a) single antenna means;
(b) two or more multiple input/multiple output (MIMO) space-time wireless transceiver means;
(c) an antenna array reduction or expansion chamber associated with said two or more MIMO space-time wireless transceivers; and
(d) a frequency spectrum shifting module associated with said two or more MIMO space-time wireless transceivers;
whereby said first modem means and said second modem means act as a high speed transmitter and a high speed receiver of data transferred between two user interfaces through the conventional wireless telecommunications link;
and further wherein said step of providing first and second modem means includes said first modem acting as a space-time transmitter, and further includes the generation of one or more output channels by said first modem, at least one of which output channels transmits forward correction coding;
said step of generating said one or more output channels includes the generation of a back channel which receives feedback from said second modem means relating to said forward correction coding, and thereby receives signal to noise information and bit error rate information to facilitate requests to retransmit corrupt data packets; and
said step of providing first and second modem means includes providing said second modem means to act as a space-time receiver, where said second modem means includes one or more input channels, at least one of which receives forward correction coding transmitted by said first modem means.

22. The method for making a wireless space-time fast modem system for transmitting data between two or more user interfaces at high transfer rates according to claim 21, wherein said high transfer rates are between about 500 kbit/sec and 1.5 Gbit/sec.

23. The method for making a wireless space-time fast modem system for transmitting between two or more user interfaces at high transfer rates according to claim 21, wherein said step of providing input channels further includes at least one of said input channels used to receive error information, analyze said error information and transfer a continuous space-time training sequence as a means to allow for reduction of channel common mode noise and compensation for doppler frequency shift and doppler spread without impacting channel capacity in high speed mobile applications.

24. The method for making a wireless space-time fast modem system for transmitting data between two or more user interfaces at high transfer rates according to claim 21, wherein said step of providing first and second modem means further includes providing said first and second modem means wherein said two or more multiple input/multiple output (MIMO) space-time wireless transceiver means includes conventional interface electronics to make said transceivers compatible with existing industry standard protocols.

25. The method for making a wireless space-time fast modem system for transmitting data between two or more user interfaces at high transfer rates according to claim 21, wherein said step of providing first and second modem means further includes providing said first and second modem means wherein said antenna array reduction or expansion chamber associated with said two or more MIMO space-time wireless transceivers includes outside shielding to prevent adverse electromagnetic interference and to prevent said MIMO space-time transceivers from generating interference adverse to other radio systems.

26. The method for making a wireless space-time fast modem system for transmitting data between two or more user interfaces at high transfer rates according to claim 21, wherein said step of providing first and second modem means further includes providing said antenna array reduction or expansion chamber associated with said two or more MIMO space-time wireless transceivers including one or more input antennas and one or more transmission antennas, whereby the number of input antennas is greater than the number of transmission antennas within any given antenna array.

27. The method for making a wireless space-time fast modem system for transmitting data between two or more user interfaces at high transfer rates according to claim 21, wherein said step of providing first and second modem means further includes providing replacing said antenna array reduction or expansion chamber by a digital signal processing (DSP) processor for the purpose of creating a unique scattering rich space-time signature to aid in the separation of signals among the input antennas within said antenna array.

28. The method for making a wireless space-time fast modem system for transmitting data between two or more user interfaces at high transfer rates according to claim 21, wherein said step of providing first and second modem means further includes providing said frequency spectrum shifting module including a down converter when associated with the first modem means, the transmitting modem, for the purpose shifting the frequency spectrum from microwave to a lower spectrum, down to base-band, in order to make said first modem compatible with standard carrier frequencies of existing infrastructure.

29. The method for making a wireless space-time fast modem system for transmitting data between two or more user interfaces at high transfer rates according to claim 28, wherein said step of providing said down converter includes providing a down converter having an oscillator with a frequency expressed as:

$$F_{fssm} = F_{vco} - F_c$$

where Ffssm is the frequency of the frequency spectrum shift module, Fvco is the frequency of the voltage control oscillator frequency, and Fc is the carrier frequency, whereby the voltage controlled oscillator is a component of said first modem means, the transmitter modem.

30. The method for making a wireless space-time fast modem system for transmitting data between two or more user interfaces at high transfer rates according to claim 21, wherein said step of providing first and second modem means further includes providing first and second modem means including said multiple input/multiple output (MIMO) space-time wireless transceiver means which utilize a single input/single output (SISO) repeater, or two or more SISO repeaters in series, to extend its operating distance range.

* * * * *